INVENTOR
F. M. GOETZ
BY
R. C. Winter
ATTORNEY

INVENTOR
F. M. GOETZ
BY
R. C. Winter
ATTORNEY

INVENTOR
F. M. GOETZ
BY
R. C. Winter
ATTORNEY

INVENTOR
F. M. GOETZ
BY
R. C. Winter
ATTORNEY 3,184,723
Patented May 18, 1965

3,184,723

LOGIC DETECTOR CIRCUIT

Frank M. Goetz, Franklin Square, N.Y., assignor to Bell Telephone Laboratories, Incorporated, New York, N.Y., a corporation of New York Filed Dec. 29, 1960, Ser. No. 79,444
8 Claims. (Cl. 340—174.1)

This invention relates to data storage systems and more particularly to read-out logic detector circuits for magnetic data storage systems.

In the data processing field and in other areas requiring recordation and subsequent reproduction of large quantities of data, commonly used storage mediums include magnetic tapes, magnetic drums and other magnetic apparatus. Such magnetic storage mediums permit relatively simple recordation and reproduction of data through the impartation of relative motion between a magnetic transducer and the storage medium. The data may be comprised of a plurality of digits, or bits of information, each digit assuming one of two or more specific values or designations; for example, in the binary notation each digit assumes one of two specific designations. The magnetic storage medium retains the recorded data until subsequently called upon to yield the information to read-out reproduction circuitry. To be of value the recorded information must be reproduced or recovered in substantially the same form as it was recorded; i.e., both the presence and the particular value or character of each recorded digit of information must be detected.

Recordation of data in the binary notation, as mentioned above, may be accomplished by assigning one or the other of two specific designations to each of a plurality of digits of information. The binary character of each digit of information; i.e., the binary state "1" or "0," is distinguishable therefore upon recognition of the specific designation assigned to the digit of information. In magnetic recordation, it is customary to distinguish the binary character by the direction of magnetic polarization or by various patterns of magnetic flux reversals. For example, one binary state may be designated by a single flux reversal and the other binary state may be designated by a double flux reversal, each binary recordation occurring in the same period of time called a digit time interval.

The more commonly used recording techniques include return-to-zero and nonreturn-to-zero recording. In going to higher packing densities, some form of nonreturn-to-zero recording is generally employed in magnetic storage systems. Nonreturn-to-zero recording utilizes two distinct levels of magnetization, wherein the magnetic storage medium is always saturated at one or the other of the two levels of magnetization. Thus, in the exemplary binary state designations above-mentioned, one binary state is recorded in a digit interval time by reversing the level of magnetization of the flux from one level of magnetization to the other. The other binary state is recorded in a digit time interval by reversing the flux from one level of magnetization to the other and back to the one again; i.e., two flux reversals. Accordingly, the binary character of the recorded signals may be determined for reproduction of the input information by read-out circuitry which distinguishes the number of flux reversals during a digit interval of time.

When the information is recorded at relatively low packing densities, the individual digits may be readily reproduced by conventional systems, with timing and noise discrimination presenting some of the major considerations. However, as the packing density becomes higher, not only do timing and noise considerations increase, but additional considerations arise related to variations in the amplitude and width of the recorded signals. At the higher packing densities the various flux reversals tend to become interrelated such that both the amplitude and the width of the recorded signals become distorted. Further, synchronization of external timing in recovering the recorded information becomes undesirably critical at the higher packing densities. For example, in known systems employing a separate track for timing, the alignment of the timing track and the information track becomes difficult to maintain. Moreover, the employment of a separate timing track usually detracts from the advantages derived from the utilization of the higher packing densities.

Accordingly, it is an object of this invention to provide improved read-out circuitry for recovering, without reference to external timing signals, data magnetically recorded at relatively high packing densities.

It is another object of this invention to provide a simple read-out logic detector circuit for accurately detecting the presence and indicating the character of a recorded digit of information substantially independent of the presence or character of adjacent digits of information.

Another object of this invention is to provide economical, self-clocked read-out of magnetically-recorded signals substantially independent of amplitude and width variations in the recorded signals.

Often, in the reproduction of recorded data it is desired to provide a first signal to indicate the presence of a digit of information and to provide a second signal to indicate the character of the digit of information. Consequently, it is another object of this invention to provide a simple, symmetrical logic detector circuit for producing an indication of the presence of a recorded signal and for producing a separate indication of the character of the recorded signal.

In illustrative embodiments of the present invention, the above and other objects are attained in a logic detector arrangement wherein the magnetically recorded information is read out to produce first and second detector signals, which are respectively representative of the two distinct levels of magnetization. Timing circuitry is provided for defining a predetermined time interval. Information circuitry responsive to the detector signals and the timing circuitry provides an indication of the presence and binary character of the recorded signals. Thus, the presence of only one detector signal during the predetermined time interval, defined by the timing circuitry, is representative of one flux reversal during the time interval. This advantageously provides an information signal indicative of one binary state. The presence of two detector signals during the predetermined time interval is representative of two flux reversals and thus provides an indication of the other binary state.

In accordance with one aspect of this invention, high noise discrimination and relative insensitivity to amplitude and width fluctuations are achieved in a logic detector circuit employing a difference preamplifier for providing complementary signals to individual peak detection circuitry. The complementary signals are respectively representative of the two recorded levels of magnetization. Therefore, the peak detection circuitry provides a first detector signal representative of one level of magnetization and a second detector signal representative of the other level of magnetization, each accurately determined with respect to time. The provision of complementary signals from the difference preamplifier permits substantially identical circuitry to be utilized for detecting the recorded levels of magnetization, resulting in a relatively simple and symmetrical logic detector arrangement.

In accordance with another aspect of the present invention, the first and second detector signals, respectively representative of the two distinct levels of magnetization, as connected to a timer and through steering circuitry to an information flip-flop. The presence of one of the first and second detector signals energizes the timer, places the information flip-flop in one of its two stable states, and activates the steering circuitry for gating a successive detector signal to place the information flip-flop in the other of its two stable states. Energization of the timer produces an output pulse after an interval of time slightly less than a digit time interval for deactivating the steering circuitry. Therefore, the successive detector signal will place the information flip-flop in the other of its stable states only if it arrives during the same digit time interval as the preceding detector signal. Otherwise, the information flip-flop will remain in the one of its two stable states. Thus, the one of the two stable states of the information flip-flop is indicative of the binary state designated by two flux reversals and the other of the two flip-flop states is indicative of the binary state designated by one flux reversal.

In accordance with a further aspect of this invention, lost or mutilated digits of information may be detected advantageously through the provision of circuitry for indicating the absence of flux reversals during a digit time interval. Such indication may be utilized to advance a counter to provide a record of the number of digits of information lost or mutilated. Further, the indication may be utilized to actuate an alarm circuit when a loss is detected.

Accordingly, it is a feature of my invention that a logic detector arrangement comprise transducer circuitry for detecting magnetically recorded signals and for producing an output waveform representative thereof, circuitry for providing a first output signal representative of one level of magnetization and for providing a second output signal representative of another level of magnetization, timing circuitry responsive to one of the first and second output signals for defining a predetermined time interval, and circuitry responsive to the first and second output signals and to the timing circuitry to provide an indication of the digital character of the recorded signals.

It is another feature of my invention that circuitry for the detection of recorded magnetic flux reversals comprise a bipolar amplifier for providing complementary signals representative of the recorded flux reversals to individual peak detector circuits, circuitry responsive to the peak detector output signals for defining a digit time interval, and circuitry for observing the peak detector output signals during a digit time interval to provide an indication of the digital content of the recorded flux reversals.

These and other objects and features of this invention will be better understood upon consideration of the following detailed description and the accompanying drawing, in which.

Figure 1:
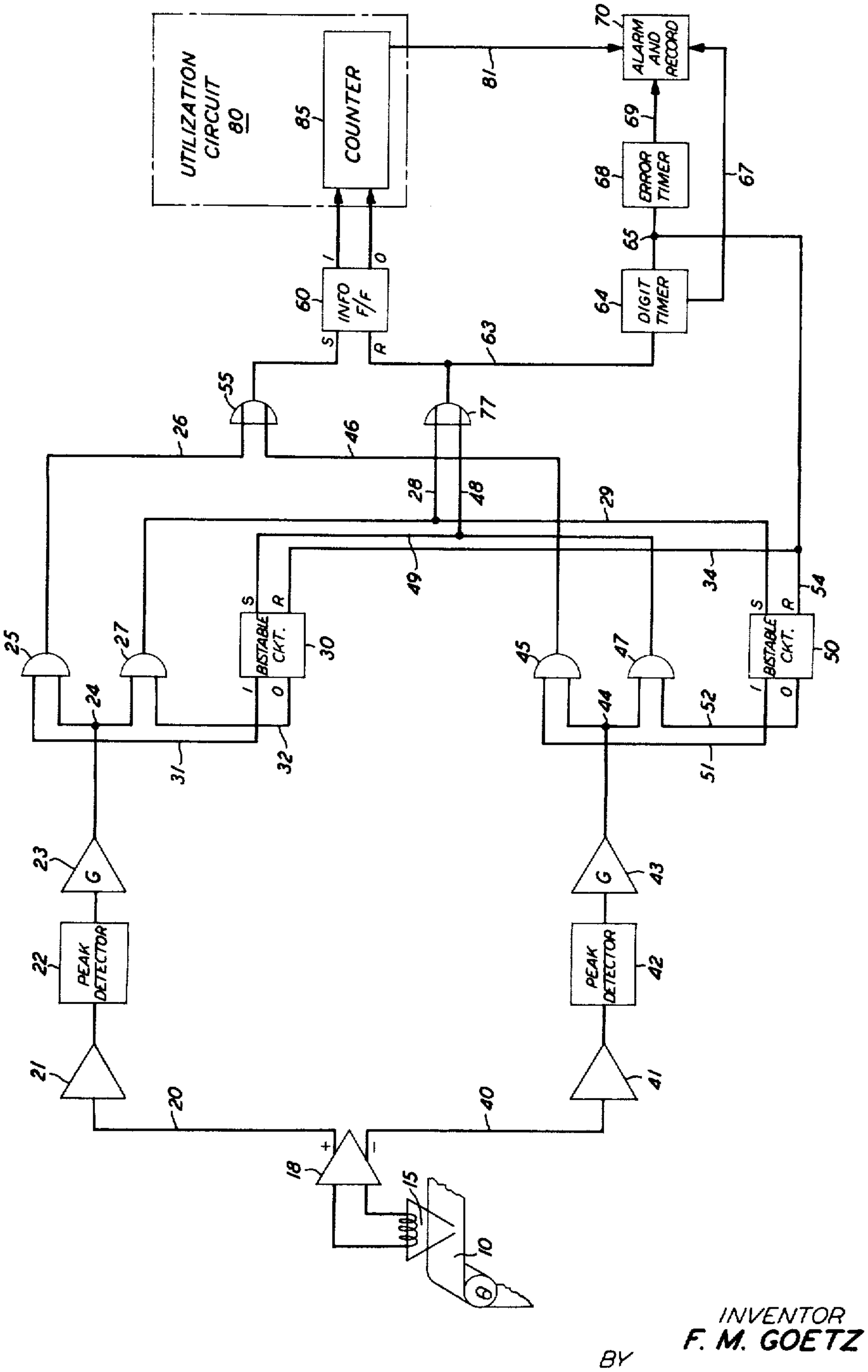
FIG. 1 is a block diagram of an illustrative embodiment in accordance with the principles of my invention.

Referring more particularly to the drawing, in which like parts are referred to by like reference numerals, the embodiment shown in FIG. 1 illustrates the principles of my invention for reproducing magnetically recorded data. For purposes of illustration, a magnetic tape 10 is shown as the magnetic storage medium upon which the data is recorded for subsequent reproduction. A reading transducer 15, which may also be employed advantageously for recording the data, is situated adjacent tape 10 and is electrically coupled to the input of preamplifier 18. As will become apparent herein, preamplifier 18 is preferably of the difference amplifier type for providing complementary outputs on conductors 20 and 40 to individual peak detection and steering circuitry. The peak detection and steering circuitry connected to conductor 20 and to conductor 40 functions to detect, respectively, the signals associated with opposite levels of magnetization recorded on tape 10. Due to the complementary nature of the signals appearing on conductors 20 and 40, this may be accomplished advantageously with substantially identical circuitry connected to conductor 20 and to conductor 40.

Signals on conductor 20 are amplified by amplifier 21 and applied to peak detector circuit 22, which accurately determines the signal peaks associated with one level of magnetization and, through gate amplifier 23, provides gating pulses representative thereof to point 24 connected to inputs of AND gates 25 and 27. Similarly, the signal peaks associated with the other level of magnetization on conductor 40 are determined via amplifier 41, peak detector 42, and gate amplifier 43 to provide pulses representative thereof to point 44 connected to inputs of AND gates 45 and 47. Consequently, the pulses appearing at points 24 and 44 alternate in occurrence, the importance of which will be considered more fully hereinbelow.

The AND gates 25 and 27 and AND gates 45 and 47 have associated therewith individual bistable circuits 30 and 50, respectively, to function as temporary memory units for pulse steering purposes. One output terminal of bistable circuit 30 is connected to an input of AND gate 25 and the other output terminal is connected to an input of AND gate 27. In the same bistable state relationship as the outputs of bistable circuit 30, the outputs of bistable circuit 50 are connected to inputs of AND gates 45 and 47. The set terminals of bistable circuits 30 and 50 are connected via conductors 49 and 29, respectively, to the outputs of AND gates 47 and 27. Further, the outputs of AND gates 27 and 47 are connected via conductors 28 and 48, respectively, to the reset terminal of information flip-flop 60 through OR gate 77, and to the set terminal of digit timer 64 via conductor 63. The outputs of AND gates 25 and 45 are connected via conductors 26 and 46, respectively, to OR gate 55, the output of which is connected to the set terminal of information flip-flop 60. An output of digit timer 64 at point 65 is applied via conductors 34 and 54, respectively, to the reset terminals of bistable circuits 30 and 50.

Figure 2:
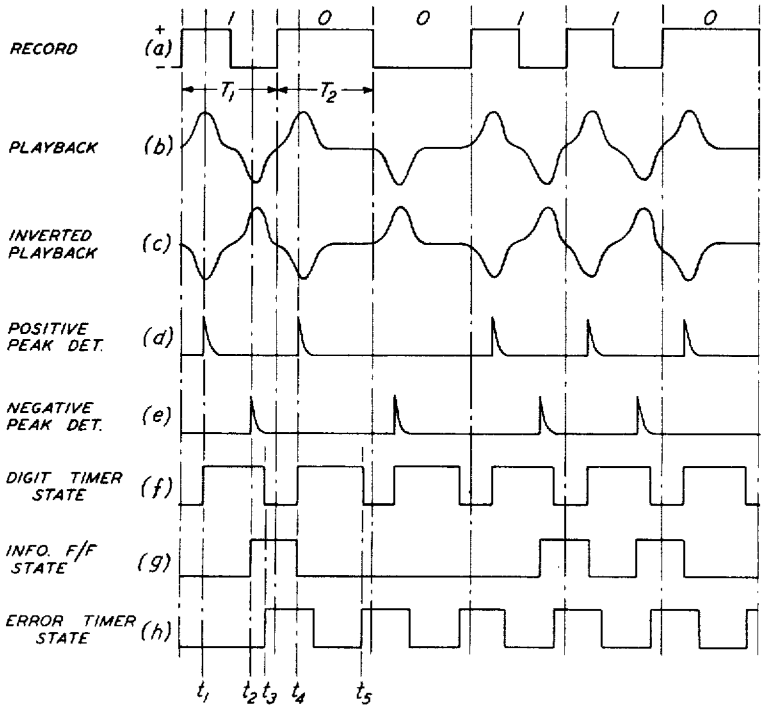
FIG. 2 is a time chart indicating the operation of the embodiments of FIGS. 1 and 3.

Considering now the embodiment of my invention thus far described, the operation is as follows. Tape 10 represents a source of magnetically recorded signals, the presence and character of which are to be accurately detected and an indication thereof provided to suitable utilization circuitry. By way of the exemplary magnetic recording mentioned above, an illustrative example of which is shown in FIG. 2(*a*), a single flux reversal on tape 10 is representative of one binary state and a double flux reversal is representative of the other binary state, each occurring in the same digit interval of time. The idealized waveform shown in FIG. 2(*a*) represents the binary word 100110, which advantageously illustrates the operation of the present invention in detecting the various combinations of successive binary digits. The particular magnetic record shown in FIG. 2(*a*) utilizes one flux reversal to represent the binary state "0" and two flux reversals to represent the binary state "1".

Through the impartation of relative motion between tape 10 and transducer 15 a signal is induced in a reading coil of the latter, with positive pulses corresponding to positive-going flux reversals and negative pulses corresponding to negative-going flux reversals. The induced signal is applied for amplification to preamplifier 18 which is advantageously a bipolar amplifier having high noise discrimination; e.g., a difference amplifier of one of the forms known in the art. Preamplifier 18 amplifies the induced signal and provides complementary versions of the signal on conductors 20 and 40 for further amplification by amplifiers 21 and 41, respectively. For purposes of illustration, the output of amplifier 21 may be considered as the positive, or playback, signal and is of the form depicted in FIG. 2(*b*). The complementary signal at the output of amplifier 41 may be considered as the negative, or inverted playback, signal and is depicted in FIG. 2(*c*).

Referring back to the exemplary recorded signals, it will be recalled that a binary "1" is distinguished from a binary "0" by the number of flux reversals in a given period of time called a digit time interval. In the magnetically recorded signals these flux transitions occur virtually instantaneously. However, during playback the transitions tend to become masked, appearing as cycles of a frequency modulated wave. Moreover, if the signals are recorded at relatively high packing densities the various transitions during playback become somewhat interrelated, resulting in amplitude and width fluctuations. Therefore, to accurately determine the flux transitions with respect to time for purposes of subsequently identifying the binary character of the signals, the amplified complementary signals are respectively applied to peak detector circuits 22 and 42. The peak detection circuits 22 and 42 may be substantially identical in structure, each responding to peaks of only one polarity; e.g., positive polarity. Thus, the output of peak detector 22 is indicative of the positive-going flux reversals and the output of peak detector 42 is indicative of the negative-going flux reversals, as indicated by FIGS. 2(*d*) and 2(*e*), respectively. Peak detector circuits 22 and 42 may be advantageously of the form shown in my copending application, Serial No. 65,034, filed October 26, 1960, now abandoned.

The outputs of peak detectors 22 and 42 are amplified and shaped into suitable gating pulses by gate amplifiers 23 and 43, and are applied to the steering circuitry at points 24 and 44, respectively. Due to the nature of the recorded signals and to the complementary form of detection, the pulses appearing at point 24 and 44 alternate in occurrence. Thus, a pulse appearing at either point 24 or 44 during a digit time interval represents a single flux reversal and pulses appearing at both points 24 and 44 during a digit time interval represent the detection of a double flux reversal. Consequently, by utilizing the appearance of a pulse at either point 24 or 44 to establish a period of time to observe the other one of points 24 and 44 for a subsequent pulse, the character of the signal recorded in the period of time may be readily determined. The appearance of the subsequent pulse indicates a recorded "1," and the absence of the subsequent pulse indicates a recorded "0". Accordingly, to facilitate further discussion, the appearance of a pulse at point 24 or 44 for establishing a period of time for observing the other point will be referred to as a clock pulse. The subsequent pulse, if present, will be referred to as an information pulse.

Assuming now that no signals have been detected from tape 10 for some time and that bistable circuits 30 and 50 are in the reset condition, consider the detection of the signals depicted in FIG. 2, with time proceeding from left to right. The first digit recorded on tape 10 to be sensed by transducer 15 is a binary "1" characterized in FIG. 2(*a*) by two flux reversals occurring in digit time intervals $T_1$. During playback a positive pulse, followed by a negative pulse occurring approximately one-half digit time interval later, is induced in transducer 15. The induced positive and negative pulses are amplified by preamplifier 18 and provided as the complementary signals illustrated in FIGS. 2(*b*) and 2(*c*) to peak detectors 22 and 42, respectively. Both detectors respond to only positive polarity signals. Therefore, at time $t_1$ a peak is detected in the playback signal applied to detector 22, in the manner discussed above, to provide an output pulse at point 24 representative of the positive polarity signal induced in transducer 15. This output pulse is the clock pulse for digit time interval $T_1$.

The AND gate 27, enabled by the reset condition of bistable circuit 30, steers the clock pulse from point 24 to perform the following three functions: (1) reset information flip-flop 60 via conductor 28 and OR gate 77; (2) set bistable circuit 50 via conductor 29; and (3) set digit timer 64 via OR gate 77 and conductor 63. As will become apparent these three functions are similarly performed by the clock pulse in each digit time interval. Information flip-flop 60 is in the reset condition as shown in FIG. 2(*g*) and remains reset until an information pulse is detected to place it in the set condition to indicate a detected binary "1." Bistable circuit 50 is placed in the set condition to remember that a clock pulse has been detected for the present digit time interval and to identify a subsequent pulse detected in the digit time interval as an information pulse.

Digit timer 64 is set by the clock pulse to define a period of time for observing point 44 for a subsequent information pulse. Since the interval of time between subsequent clock pulses is equal to a digit time interval, the period of time defined by digit timer 64 is chosen as slightly less than a digit interval of time. As illustrated in FIG. 2(*f*), digit timer 64 is set by the clock pulse at time $t_1$ to define a period of time approximately equal to three-fourths of a digit time interval. At the end of this period of time; i.e., upon time-out at time $t_3$, digit timer 64 provides a time-out pulse on conductors 34 and 54 to reset bistable circuits 30 and 50, respectively.

However, during digit time interval $T_1$, before digit timer 64 times out, an output pulse arrives at point 44 at time $t_2$. This output pulse is the information pulse for digit time interval $T_1$ and is derived from a positive peak detected in the inverted playback signal by peak detector 42. Since digit timer 64 has not timed out to reset bistable circuit 50, the AND gate 45 is enabled thereby via conductor 51 to pass the information pulse to the set terminal of information flip-flop 60. This places information flip-flop 60 in the set condition as shown in FIG. 2(*g*) and indicates that the character of the recorded signal is a binary "1." Information flip-flop 60 remains in the set condition until reset by a clock pulse in the subsequent digit time interval. Of course, at time $t_3$ the time-out pulse from digit timer 64 resets bistable circuit 50 as mentioned above.

The second digit recorded on tape 10, in the illustrative example shown in the time chart of FIG. 2, is a binary "0" characterized by a single flux reversal occurring in digit time interval $T_2$. During playback a positive pulse is induced in transducer 15, amplified in preamplifier 18 and amplifier 21, and the peak thereof detected at time $t_4$ by peak detector 22 to provide a clock pulse at point 24. In a manner substantially similar to that discussed above, the clock pulse at time $t_4$ in digit time interval $T_2$ resets information flip-flop 60, sets bistable circuit 50 and sets digit timer 64. The inverted playback signal applied to peak detector 42 during digit time interval $T_2$ is absent of positive polarity peaks. Consequently, no output pulse is provided at point 44. Therefore, information flip-flop 60 remains reset to indicate a detected "0"; and at time $t_5$, bistable circuit 50 is reset by the time-out pulse from digit timer 64.

Successive digits recorded on magnetic tape 10 are detected in a similar manner and an indication of the binary character thereof is provided by information flip-flop 60. In each digit interval of time containing a binary "1" or a binary "0" a clock pulse is derived which resets information flip-flop 60, sets digit timer 64 to provide a time-out pulse after three-fourths digit time interval, and sets one of the bistable circuits 30 and 50. An information pulse occurring in the digit time interval; i.e., before digit timer 64 times out, is steered to the set terminal of information flip-flop 60 to indicate a detected binary "1." The absence of an information pulse in the digit time interval leaves information flip-flop 60 reset to indicate a detected binary "0." The output terminals of information flip-flop 60 may be advantageously connected to utilization circuitry 80 as indicated in FIG. 1, which may include data processing circuitry for utilizing the binary information derived from magnetic tape 10. For example, magnetic tape 10 may be employed in recording large quantities of data from a plurality of sources which is subsequently read out by the logic detector arrangement of the present invention for compilation, summarization, storage, printing, or other processing in utilization circuitry 80.

Often it is desirable, or even necessary, in the reproduction of recorded data to provide an indication of lost or mutilated digits, or to provide a count thereof. Such may be readily provided in the read-out logic detector arrangement in accordance with the principles of the present invention through the incorporation of circuitry for monitoring the logic detection and for indicating the absence of flux reversals in a digit time interval. In the embodiment of FIG. 1 error timer 68 is set by the time-out pulse from digit timer 64 and remains set for a period of time approximately equal to one-half digit time interval, as indicated in FIG. 2(*h*). Upon time-out, error timer 68 provides an error pulse on conductor 69 to alarm and record circuit 70. Another signal is applied to alarm and record circuit 70 via conductor 67, from an output of digit timer 64, when digit timer 64 is in the reset condition. In the illustrative example above, clock pulses derived from magnetic tape 10 set digit timer 64 for approximately the last three-fourths of each digit interval of time. Thus, the presence of successive clock pulses permits the signal to appear on conductor 67 only during approximately the first one-fourth of each digit time interval. Accordingly, the appearance of an error signal on conductor 69, concurrently with the appearance of a signal on conductor 67, indicates that it has been more than a digit interval of time since the occurrence of the last previous clock pulse. Therefore, the clock pulse for the present digit time interval has been lost or mutilated; and alarm and record circuit 70 advantageously provides a suitable alarm signal and records the loss.

However, usually the digits recorded on tape 10 are organized in words or groups of digits separated by a plurality of digit intervals wherein no flux reversals are recorded. Therefore, a blocking signal from utilization circuit 80 should provide an indication of the end of words or groups of digits to prevent the improper registrations of the separation as lost or mutilated digits. In FIG. 1 such a signal is derived, for example, from the last digit stage of counter 85, in which the detected digits for each word from tape 10 are temporarily transferred. When all of the digits of a word are transferred to counter 85, the last digit will provide a signal on lead 81 to alarm and record circuit 70, which will remain until the first digit of the next subsequent word has been transferred to counter 85. Thus, the presence of an end-of-the-word signal on conductor 81 blocks the concurrent appearance of signals on conductors 67 and 69 from giving an erroneous error indication. For the illustrative arrangement of FIG. 1, proper indication of lost or mutilated digits is the concurrent presence of signals on conductors 67 and 69, in the absence of a signal on conductor 81.

Figure 3:
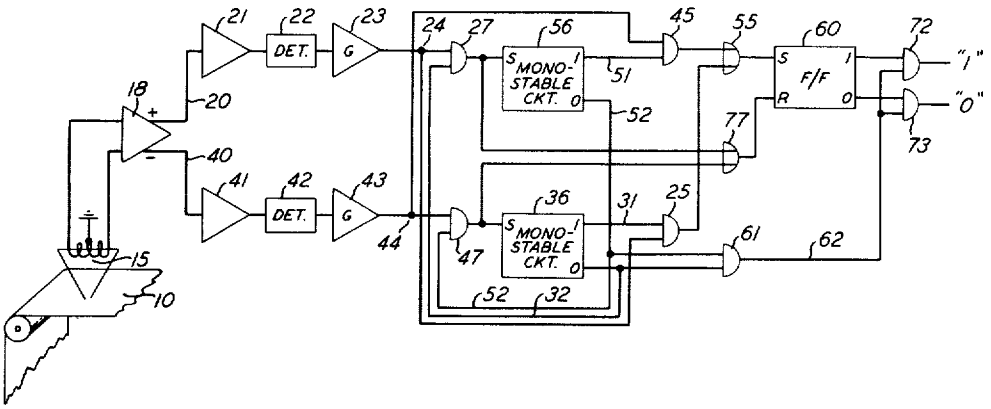
FIG. 3 is a block diagram of an alternative embodiment in accordance with the principles of my invention.

An alternative illustrative embodiment in accordance with the principles of my invention is shown in FIG. 3. Like elements are referred to by the same reference numerals as in FIG. 1. In a manner similar to the embodiment of FIG. 1, output pulses representative of the flux reversals recorded on magnetic tape 10 are provided at points 24 and 44, and via steering circuitry to the set and reset terminals of information flip-flop 60. In the embodiment of FIG. 3 monostable circuits 36 and 56 replace bistable circuits 30 and 50, respectively, and digit timer 64 of the embodiment of FIG. 1. Monostable circuits 36 and 56 provide the temporary memory for the steering circuitry; and further, responsive to clock pulses at points 24 and 44, they provide a period of time for observing points 24 and 44 for an information pulse in the digit time intervals. The set terminals of monostable circuits 36 and 56 are connected to the outputs of AND gates 47 and 27, respectively. The outputs of monstable circuits 36 and 56 are connected to inputs of AND gates 25, 27, 45 and 47 in the same relationship as the outputs of bistable circuits 30 and 50 are in FIG. 1. Monostable circuits 36 and 56, when set by pulses applied to the set terminals thereof, provide an output pulse on conductors 31 and 51, respectively, to inputs of AND gates 25 and 45 for a period of time approximately equal to three-fourths digit time interval. When monostable circuits 36 and 56 are in their stable states, an output signal is provided on conductors 32 and 52, respectively, to inputs of AND gates 27 and 47.

The operation of the embodiment of FIG. 3 thus described is similar, therefore, to the operation of the embodiment of FIG. 1. A first output pulse appearing at point 24 or 44 in a digit time interval, referred to as a clock pulse, sets monostable circuit 36 or 56 associated therewith. For example, assuming monostable circuits 36 and 56 to be initially in their stable states and considering the digit time interval $T_1$ illustrated in FIG. 2, a clock pulse appearing at point 24 at time $t_1$ sets monostable circuit 56 and resets information flip-flop 60. The AND gate 45 is enabled via the output on conductor 51 from monostable circuit 56, and the information pulse appearing at point 44 at time $t_2$ is gated therethrough to the set terminal of information flip-flop 60. At time $t_3$ monostable circuit 56 returns to its stable state, removing the enabling signal from conductor 51. Clearly, therefore, the appearance of a clock pulse at point 24 or 44 provides an indication to the reset terminal of information flip-flop 60 of the presence of a digit of information and, further, it activates the monostable circuit associated therewith to define a predetermined period of time for observing the points 24 and 44 to steer an information pulse to the set terminal of information flip-flop 60.

The particular embodiment shown in FIG. 3 provides an output pulse, indicative of the state of information flip-flop 60 and thus of the detected digit of information, during the period of time that monostable circuits 36 and 56 are both in their stable states. The AND gate 61 provides an output pulse on conductor 62 to enable the AND gates 72 and 73 when both monostable circuit 36 and monostable circuit 56 are in the stable state. Consequently, information pulses of approximately one-fourth digit interval duration are available at the outputs of AND gates 72 and 73, which are representative of the binary states "1" and "0," respectively.

Figure 4:
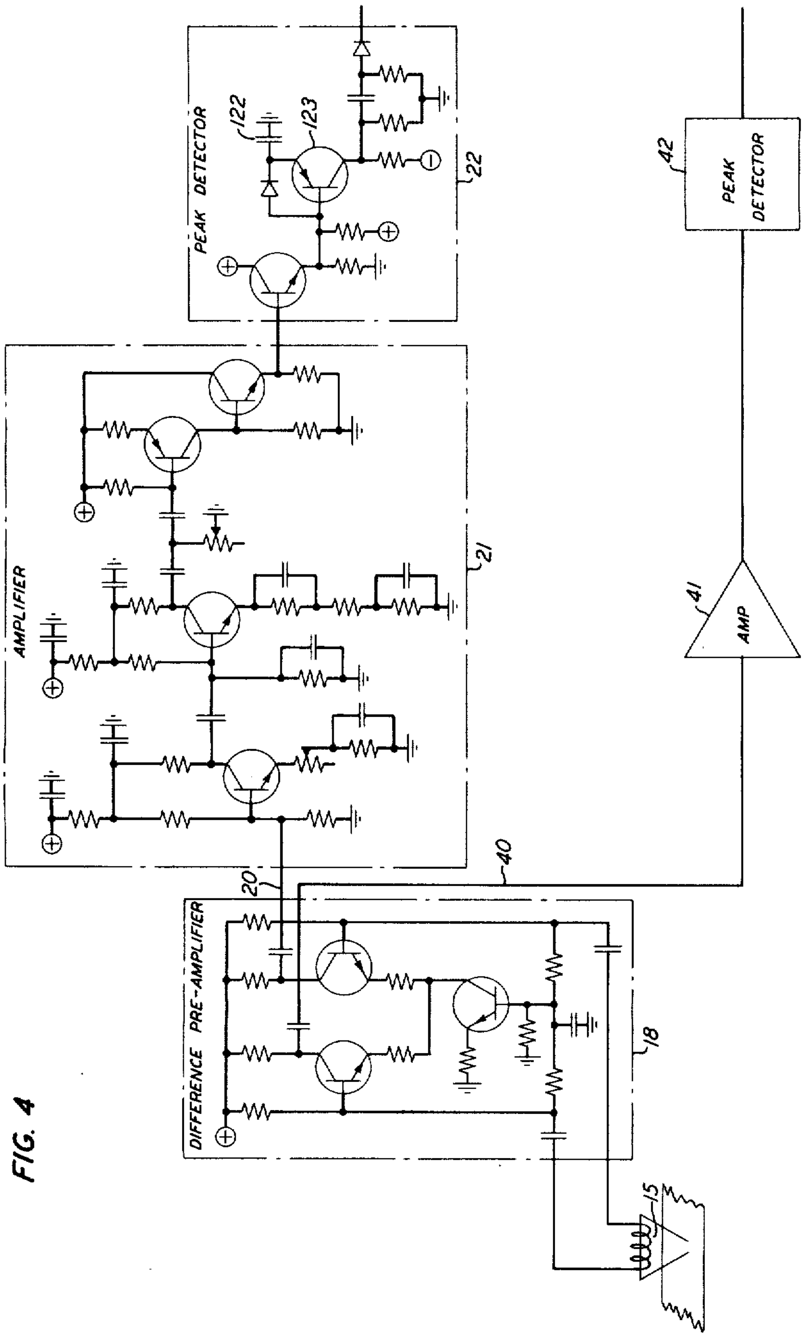
FIGS. 4 and 5 illustrate schematically a portion of the embodiment of FIG. 1.
Figure 5:
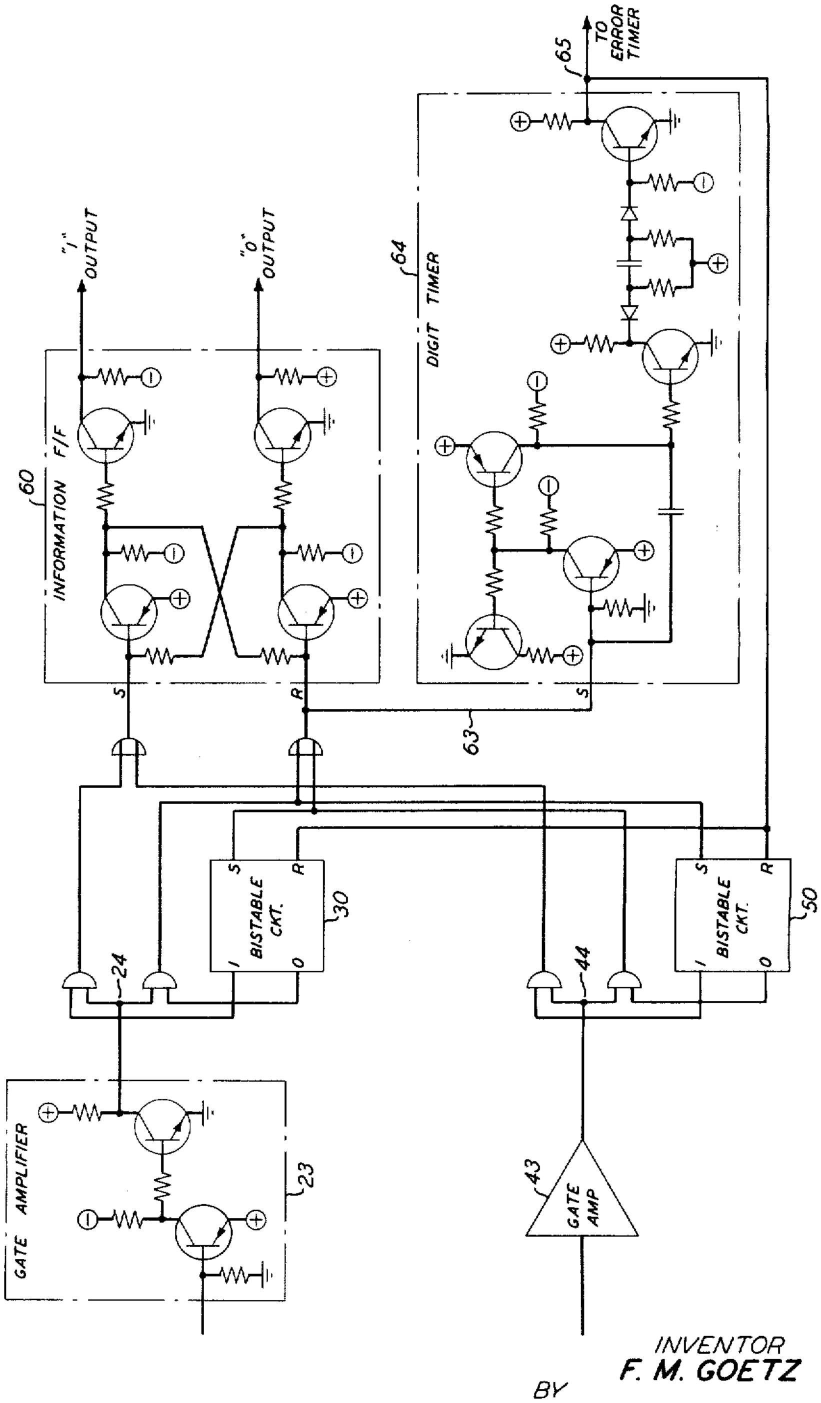

In FIGS. 4 and 5, with FIG. 4 arranged to the left of FIG. 5, a portion of the embodiment of FIG. 1 is shown in greater detail. In particular, exemplary circuitry is shown in schematic form for the playback, or positive signal, portion of the logic detector arrangement. Similar elements of the inverted playback, or negative signal, portion of the circuitry are shown in block diagram form and are substantially identical to those shown in detail. FIGS. 4 and 5, in conjunction with FIG. 1, clearly illustrate the simplicity and symmetry of the improved logic detector arrangement of the present invention.

Read-out signals induced in a reading coil of transducer 15 are applied to the inputs of difference amplifier 18. The signals are amplified and provided at the collector electrodes as complementary signals on conductors 20 and 40. The playback signal on conductor 20 is further amplified by amplifier 21, which comprises a two-stage linear amplifier and a power amplifier in the exemplary circuitry, and is applied to the input of peak detector 22. Peak detector 22, responsive to signal peaks of positive polarity above a preselected magnitude, produces signals bearing a fixed time relationship with the occurrence of each peak, in a manner more fully described in my above-mentioned copending application. Briefly, the input signal to peak detector 22 charges capacitor 122 which switches transistor 123 when the input signal begins to drop from its peak values. The changing state of transistor 123 generates a sharp pulse to the input of gate amplifier 23, which amplifies and shapes the detector pulses into suitable logic signals to drive the other logic circuitry. These detector pulses, at point 24, are representative of the positive-going signals induced in transducer 15. Detector pulses, at point 44, representative of the negative-going signals induced in transducer 15, are provided in a substantially similar manner by the inverted playback signal on conductor 40.

The detector pulses alternate at points 24 and 44, as mentioned above. Each successive pulse is either a clock pulse or an information pulse. The state of the temporary memory units, bistable circuits 30 and 50, determines whether a pulse arriving at point 24 or 44 is a clock pulse or an information pulse, and steers it through AND and OR logic gates, as known in the art, to the appropriate input terminal of information flip-flop 60, in the manner described hereinbefore. The illustrative circuitry shown in FIG. 5 for flip-flop 60 may be similarly employed advantageously in bistable circuits 30 and 50.

It is understood that the above-described arrangements are merely illustrative of the application of the principles of the invention. Numerous other arrangements may be devised by those skilled in the art without departing from the spirit and scope of this invention.

What is claimed is:

1. A logic detector circuit for recorded binary information comprising transducer means for deriving a full cycle waveform from said recorder information, means for separating said waveform into first and second portions, first means for detecting the signal peaks of said first portions of said waveforms, second means for detecting the signal peaks of said second portions of said waveform, information means having two output states, first steering means connected between said first detection means and said information means, second steering means connected between said second detection means and said information means, means operatively connected to said first and second detecting means for deriving clock signals from said recorded information, timing means responsive *to each* of said clock signals for defining a predetermined interval of time, and means actuated by said timing means for selectively controlling said first and second steering means, whereby signals from said first and second detecting means place said information means in one of its two output states corresponding to said recorded information.

2. A logic detector circuit for recording magnetic signals comprising means for scanning said recorded signals to produce an output waveform representative of said recorded signals, bipolar amplifier means connected to said scanning means and having first and second complementary outputs, first and second peak detection means connected respectively to said first and said second complementary outputs and responsive to signals of the same polarity to generate peak indications, timing means, an information flip-flop having set and reset input terminals and having two distinct output terminals, means for applying a peak indication from one of said peak detection means to said timing means for providing an output pulse after a predetermined interval of time, means for applying said peak indication to the reset terminal of said information flip-flop, and steering circuit means responsive to the absence of an output pulse from said timing means for applying a peak indication from the other of said first and second peak detection means to the set terminal of said information flip-flop to provide an indication on one of said distinct output terminals.

3. A signal detector apparatus comprising first and second peak detection circuits, transducer means for reading signals from a magnetic storage medium, a difference amplifier connected to said transducer means and having two complementary outputs, means for connecting one of said complementary outputs to said first peak detection circuit, means for connecting the other of said complementary outputs to said second peak detection circuit, information output means having first and second terminals, first steering circuitry connected between the first terminal of said information output means and said first and second peak detection circuits, second steering circuitry connected between said second terminal of said information output means and said first and second peak detection circuits, means for generating clock signals in accordance with said signals read from said magnetic storage medium, and means including said clock signal generating means for selectively enabling said first and second steering circuitry in response to signals from said first and second peak detection circuits.

4. A signal detection circuit comprising means for generating pulses bearing a fixed time relationship to signals read from a magnetic storage medium, means for determining one of said pulses during each digit time interval as a clock signal, control circuit means for providing a first signal defining a distinct interval of time when energized by said clock signal and for providing a second signal when deenergized, first and second output terminals, first gating means connected to said first output terminal and energized by said first signal, second gating means connected to said second output terminal and energized by said second signal, means for applying the pulses from said generating means to said first and second gating means, and means including said second gating means for applying said clock signals to said control circuit means, whereby pulses from said generating means during said distinct interval of time are directed to said first output terminal.

5. A logic detector circuit for magnetically recorded signals comprising first and second detection circuits for providing signal peak indications, transducer means for reading signals from a magnetic storage medium, a difference amplifier connected to said transducer means and having complementary outputs, means for connecting one of said complementary outputs to said first detection circuit, means for connecting the other of said complementary outputs to said second detection circuit, information circuitry having two distinct terminals, control means for generating a signal defining a distinct interval of time upon receipt of a peak indication from one of said first and second detection circuits, first gating means connected to said first and second detection circuits and to one of said distinct terminals of said information circuitry, second gating means connected to said first and second detection circuits and to the other of said distinct terminals of said information circuitry, and connection means controlled by the signal from said control means for energizing one of said first and second gating means and for deenergizing the other of said first and second gating means to direct the selective application of said peak indications to said distinct terminals of said information circuitry.

6. A logic detector circuit in accordance with claim 5 wherein said control means comprises a pair of monostable circuits, each having first and second outputs, and means for applying peak indications from said first and second detection circuits to respective ones of said monostable circuits; and wherein said connection means comprises first conductors connecting said first outputs of said monostable circuits to said first gating means and second conductors connecting said second outputs of said monostable circuits to said second gating means.

7. A logic detector circuit in accordance with claim 5 wherein said control means comprises a timer, a pair of bistable circuits, each having first and second input terminals, means connecting said timer to said first terminals of said bistable circuits, and means for applying peak indications from said first and second detection circuits to said timer and to said second terminals of respective ones of said bistable circuits.

8. A logic detector circuit for magnetically recorded signals comprising first and second detection circuits for providing signal peak indications, transducer means for reading signals from a magnetic storage medium, a difference amplifier connected to said transducer means and having complementary outputs, means for connecting said complementary outputs to respective ones of said first and second detection circuits, first and second information outputs, control means for generating a signal defining a distinct interval of time upon receipt of a peak indication from one of said first and second peak detection circuits, first gating means connected to said first and second detection circuits and to said first information output, second gating means connected to said first and second detection circuits and to said second information output, means controlled by the signal from said timing means to direct the selective application of said peak indications to said first and second information outputs, and means controlled by said control means for indicating an alarm in the absence of peak indications for a predetermined interval of time greater than said distinct interval of time.

References Cited by the Examiner

UNITED STATES PATENTS

| | | | |
|---|---|---|---|
| 2,780,670 | 2/57 | Brewster | 340—174.1 |
| 2,864,077 | 12/58 | DeTurk | 340—174.1 |
| 2,887,676 | 5/59 | Hamilton | 340—174.1 |
| 2,929,049 | 3/60 | Lubkin | 340—174.1 |
| 2,936,444 | 5/60 | Hieken | 340—174.1 |
| 3,048,831 | 8/62 | Sharp | 340—174.1 |

IRVING L. SRAGOW, *Primary Examiner.*